(12) United States Patent
 Yu et al.

(10) Patent No.: US 11,485,195 B2
(45) Date of Patent: Nov. 1, 2022

(54) TEMPERATURE CONTROL METHOD AND TEMPERATURE CONTROL DEVICE

(71) Applicant: BOE TECHNOLOGY GROUP CO., LTD., Beijing (CN)

(72) Inventors: Yue Yu, Beijing (CN); Zhusong Yi, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 161 days.

(21) Appl. No.: 16/648,706

(22) PCT Filed: Jun. 27, 2019

(86) PCT No.: PCT/CN2019/093216
 § 371 (c)(1),
 (2) Date: Mar. 19, 2020

(87) PCT Pub. No.: WO2020/001523
 PCT Pub. Date: Jan. 2, 2020

(65) Prior Publication Data
 US 2020/0276881 A1   Sep. 3, 2020

(30) Foreign Application Priority Data

Jun. 29, 2018 (CN) .......................... 201810716531.9

(51) Int. Cl.
 *B60H 1/00* (2006.01)
 *G05B 13/04* (2006.01)
(52) U.S. Cl.
 CPC ..... *B60H 1/00807* (2013.01); *B60H 1/00821* (2013.01); *B60H 1/00878* (2013.01); *G05B 13/042* (2013.01)
(58) Field of Classification Search
 CPC ... F24F 11/62; G05B 13/042; B60H 1/00878; B60H 1/00807
 See application file for complete search history.

(56) References Cited

U.S. PATENT DOCUMENTS

2004/0050077 A1* 3/2004 Kasai ..................... F24F 1/0011
                                                                 454/304
2016/0291605 A1* 10/2016 Guo ......................... F24F 11/30

FOREIGN PATENT DOCUMENTS

CN     101751049     6/2010
CN     103411293     11/2013
            (Continued)

OTHER PUBLICATIONS

Zhang (The application of variable universe fuzzy PID controller in computer-aided alignment of lithography projector, Proc. SPIE 9046, 2013 International Conference on Optical Instruments and Technology: Optoelectronic Measurement Technology and Systems, 90460H (Dec. 19, 2013); (Year: 2013).*

(Continued)

*Primary Examiner* — Schyler S Sanks
(74) *Attorney, Agent, or Firm* — Calfee, Halter & Griswold LLP

(57) ABSTRACT

Disclosed is a temperature control method which includes acquiring temperature data of a plurality of temperature detection points in a target environment; calculating, according to the temperature data, an average temperature value of the plurality of temperature detection points and a first temperature difference between the average temperature value and a target temperature value; determining whether an absolute value of the first temperature difference exceeds a first temperature difference threshold; and in response to the absolute value of the first temperature difference exceeding the first temperature difference threshold, controlling the temperature of the target environment by a variable universe fuzzy proportional integral derivative control algorithm.

13 Claims, 4 Drawing Sheets

(56) References Cited

FOREIGN PATENT DOCUMENTS

| | | |
|---|---|---|
| CN | 104331097 | 2/2015 |
| CN | 104816882 | 8/2015 |
| CN | 105402860 | 3/2016 |
| CN | 105629720 | 6/2016 |
| CN | 105716322 | 6/2016 |
| CN | 107747832 | 3/2018 |
| CN | 107894716 | 4/2018 |
| CN | 108790696 | 11/2018 |
| JP | 2015-87566 | 5/2015 |
| TW | 201821924 | 6/2018 |

OTHER PUBLICATIONS

Pan (Design and Application of Variable Universe Fuzzy Controller Based on Cat Swarm Optimization, Mathematical Problems in Engineering Volume 2016, Article ID 4632064, http://dx.doi.org/10.1155/2016/4632064). (Year: 2016).*
Office action from Chinese Application No. 201810716531.9 dated Oct. 22, 2020.
Yu Yue et al., "Simulation of Variable Universe Fuzzy PID in the Micro Carbon Sink Measurement System", College of Mechanical and Electrical University of Northeast Forestry, Forest Engineering, vol. 33, No. 4, 5 pgs., Jul. 2017.
Office action from Chinese Application No. 201810716531.9 dated Mar. 3, 2020.
Office action from Chinese Application No. 201810719631.9 dated Mar. 3, 2020.

\* cited by examiner

TEMPERATURE CONTROL METHOD AND TEMPERATURE CONTROL DEVICE

CROSS REFERENCE TO RELATED APPLICATIONS

The present application is a 35 U.S.C. § 371 national stage application of PCT International Application No. PCT/CN2019/093216, filed on Jun. 27, 2019, which claims the benefit of Chinese Patent Application No. 201810716531.9, filed on Jun. 29, 2018, the entire disclosures of which are incorporated herein by reference.

TECHNICAL FIELD

The present disclosure relates to the field of intelligent control technologies, and in particular, to a temperature control method and a temperature control device.

BACKGROUND

In contemporary society, the use of automobiles is becoming more and more common. The temperature inside the automobile has a certain impact on the driving and traveling experience and safety of drivers and passengers. Especially, in summer, the temperature inside the automobile may be too high, which is very unfavorable for children and elderly people with hypertension. Therefore, there is a need to control the temperature inside the automobile.

At present, general vehicles are equipped with an air-conditioning system to control the temperature in the vehicle, but usually there is only one temperature sensor used to detect and control the temperature of a local space, which results in low control accuracy so as not to satisfy the passenger's experience in the vehicle.

SUMMARY

According to an exemplary embodiment, there is provided a temperature control method, comprising: acquiring temperature data of a plurality of temperature detection points in a target environment; calculating, according to the temperature data, an average temperature value of the plurality of temperature detection points and a difference between the average temperature value and a target temperature value, which is taken as a first temperature difference; determining whether an absolute value of the first temperature difference exceeds a first temperature difference threshold; and in response to the absolute value of the first temperature difference exceeding the first temperature difference threshold, controlling the temperature of the target environment by a variable universe fuzzy PID control algorithm.

In some exemplary embodiments of the temperature control method, the controlling of the temperature of the target environment by a variable universe fuzzy proportional integral derivative (PID) control algorithm comprises: calculating a first temperature difference change rate by a differential method; determining an adjustment variable by means of a variable universe fuzzy control algorithm according to the first temperature difference and the first temperature difference change rate; determining a real-time control parameter by means of a PID control algorithm according to the first temperature difference and the adjustment variable; and generating a control signal according to the real-time control parameter to control the temperature of the target environment.

In some exemplary embodiments of the temperature control method, determining an adjustment variable by means of a variable universe fuzzy control algorithm according to the first temperature difference and the first temperature difference change rate comprises: determining an input universe scaling factor and an output universe scaling factor according to the first temperature difference and the first temperature difference change rate; fuzzifying the first temperature difference and the first temperature difference change rate to obtain a fuzzified input; performing fuzzy reasoning according to a fuzzy control rule to convert the fuzzified input into a fuzzified output; and defuzzifying the fuzzified output to obtain the adjustment variable.

In some exemplary embodiments of the temperature control method, the input universe scaling factor is determined by the following piecewise proportional function:

$$\alpha(e) = \begin{cases} \left(\frac{|e|}{x_{e\ max}}\right)^{\lambda_i} + \varepsilon_i & |e| < \theta_i \\ 1 & |e| \geq \theta_i \end{cases}$$

$$\alpha(ec) = \begin{cases} \left(\frac{|ec|}{x_{ec\ max}}\right)^{\lambda_i} + \varepsilon_i & |ec| < \theta_i \\ 1 & |ec| \geq \theta_i \end{cases}$$

wherein e and ec represent the first temperature difference and the first temperature difference change rate respectively, which have basic universes of $X_e=[-x_{emax}, x_{emax}]$ and $x_{ec}=[-x_{ecmax}, x_{ecmax}]$, respectively, and wherein $\theta_i$ is a piecewise threshold, parameters $\lambda_i$ and $\varepsilon_i$ are sensitivity adjustment parameters, wherein i=1,2.

In some exemplary embodiments of the temperature control method, the output universe scaling factor is determined by the following formula:

$$\beta(e, ec) = \frac{1}{2}\left[\left(\frac{|e|}{x_{e\ max}}\right)^{0.7} + \left(\frac{|ec|}{x_{ec\ max}}\right)^{0.7}\right]$$

wherein e and ec respectively represent the first temperature difference and the first temperature difference change rate, which have basic universes of $X_e=[-x_{emax}, x_{emax}]$ and $X_{ec}=[-x_{ecmax}, x_{ecmax}]$, respectively.

In some exemplary embodiments of the temperature control method, the performing fuzzy reasoning according to a fuzzy control rule to convert the fuzzified input into a fuzzified output comprises performing the fuzzy reasoning by means of Mamdani algorithm.

In some exemplary embodiments of the temperature control method, the defuzzifying the fuzzified output to obtain the adjustment variable comprises: defuzzifying the fuzzified output by means of a centroid method.

In some exemplary embodiments of the temperature control method, the determining a real-time control parameter by means of a PID control algorithm according to the first temperature difference and the adjustment variable comprises: performing parameter tuning according to the first temperature difference by means of the PID control algorithm to obtain an initial control parameter; and determining the real-time control parameter by accumulating the initial control parameter and the adjustment variable.

In some exemplary embodiments of the temperature control method, the method further comprises: in response to the absolute value of the first temperature difference not exceeding the first temperature difference threshold, calculating a temperature difference between any two adjacent temperature detection points in the plurality of temperature detection points according to the temperature data, which is taken as a second temperature difference; determining whether an absolute value of the second temperature difference exceeds a second temperature difference threshold; and in response to the absolute value of the second temperature difference exceeding the second temperature difference threshold, adjusting airflow of the target environment.

In some exemplary embodiments of the temperature control method, the method further comprises: before calculating, according to the temperature data, an average temperature value of the plurality of temperature detection points and a difference between the average temperature value and a target temperature value, receiving a setting of the target temperature value.

According to another exemplary embodiment, there is provided a temperature control device comprising:

a data acquisition module configured to acquire temperature data of a plurality of temperature detection points in a target environment;

a data processing module configured to calculate, according to the temperature data, an average temperature value of the plurality of temperature detection points and a difference between the average temperature value and a target temperature value, which is taken as a first temperature difference;

a determination module configured to determine whether an absolute value of the first temperature difference exceeds a first temperature difference threshold; and a first temperature control module configured to, in response to the absolute value of the first temperature difference exceeding the first temperature difference threshold, control the temperature of the target environment by a variable universe fuzzy PID control algorithm.

In some exemplary embodiments of the temperature control device, the first temperature control module comprises: a differentiator configured to calculate a first temperature difference change rate by a differential method according to the first temperature difference; a fuzzy controller configured to determine an adjustment variable by means of a variable universe fuzzy control algorithm according to the first temperature difference and the first temperature difference change rate; and a PID controller configured to determine a real-time control parameter by means of a PID control algorithm according to the first temperature difference and the adjustment variable and thereby to generate a control signal for controlling the temperature of the target environment.

In some exemplary embodiments of the temperature control device, the temperature control device further comprises a second temperature control module configured to: in response to the absolute value of the first temperature difference not exceeding the first temperature difference threshold, calculate, according to the temperature data, a temperature difference between any two adjacent temperature detection points in the plurality of temperature detection points, which is taken as a second temperature difference; determine whether an absolute value of the second temperature difference exceeds a second temperature difference threshold; and in response to the absolute value of the second temperature difference exceeding the second temperature difference threshold, adjust airflow of the target environment.

In some exemplary embodiments of the temperature control device, the temperature control device further comprises an execution mechanism configured to adjust the temperature of the target environment, and the first temperature control module is further configured to control the temperature of the target environment by a variable universe fuzzy PID control algorithm by means of the execution mechanism.

In some exemplary embodiments of the temperature control device, the execution mechanism comprises a heating system and a refrigeration system.

In some exemplary embodiments of the temperature control device, the temperature control device further comprises: a target temperature setting module configured to receive a setting of the target temperature value; and a display module configured to display at least one of the temperature data and the average temperature value.

According to another exemplary embodiment, there is provided a computer-readable storage medium having stored thereon computer-readable instructions that, when executed, perform the temperature control method according to some exemplary embodiments.

BRIEF DESCRIPTION OF THE DRAWINGS

In order to explain the technical solutions in the exemplary embodiments more clearly, the drawings used in the exemplary embodiments will be briefly introduced below.

DETAILED DESCRIPTION

Figure 1:
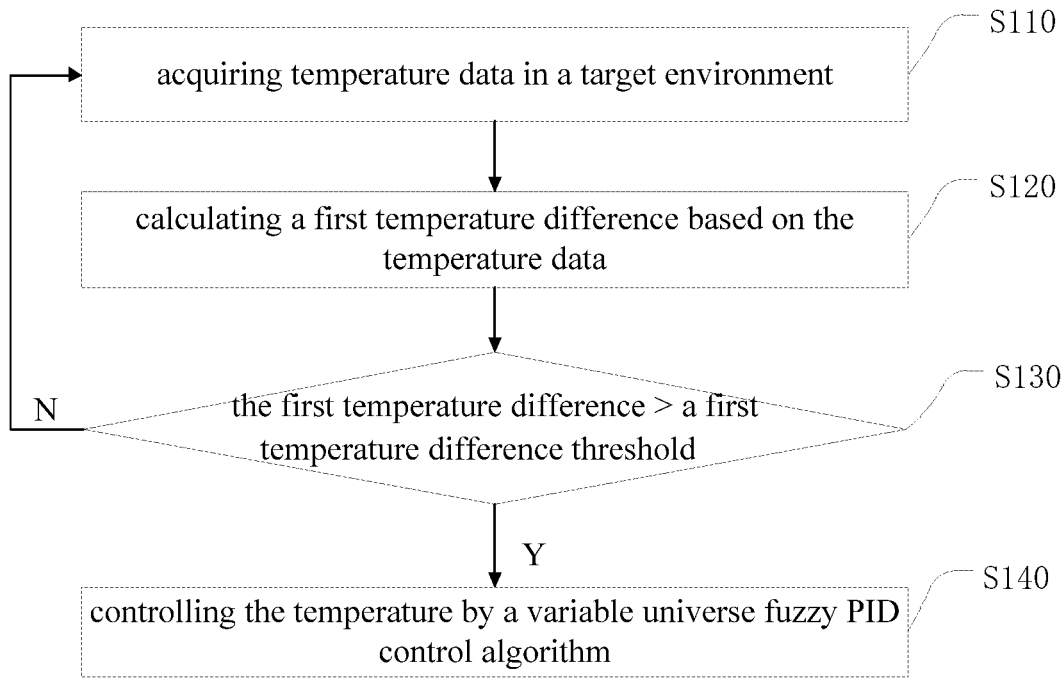
FIG. 1 schematically illustrates a flowchart of a temperature control method according to some exemplary embodiments.

Hereinafter, exemplary embodiments will be described in detail. Examples of the embodiments are shown in the accompanying drawings, where the same or similar reference numerals represent the same or similar elements or elements having the same or similar functions throughout. The embodiments described below with reference to the drawings are exemplary, and are only used to explain the present disclosure, and cannot be construed as limiting the present disclosure.

Those skilled in the art will understand that the singular forms "a", "an" and "the" used herein may also include plural forms unless specifically stated. It should be further understood that the term "including/comprising" used in the specification of the present disclosure refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it can be directly connected or coupled to the other element, or intervening elements may also be present. Furthermore, "connected" or "coupled" as used herein may include wirelessly connected or wirelessly coupled. As used herein, the term "and/or" includes all or any of the elements and all combinations of one or more of the associated listed items.

To make the objects, technical solutions, and advantages of the present disclosure clearer, the exemplary embodiments will be optionally described in detail below in conjunction with the accompanying drawings. The following description specifically describes the technical solutions of the present disclosure and how the technical solutions of the present disclosure solve the above technical problems in conjunction with the specific embodiments. The following several exemplary embodiments may be combined with each other, and the same or similar concepts or processes may not be repeated in some embodiments. The exemplary embodiments will be described below with reference to the drawings.

In related technologies, the environmental temperature control method includes PID (Proportional-Integral-Derivative) control, fuzzy control, and the like. PID control has been applied earlier in the environmental temperature control. However, due to the characteristics of the environmental temperature such as non-linearity, hysteresis, time-varying, uncertainty, etc., the conventional PID's control effect on the environmental temperature is not ideal. For fuzzy control, it is not necessary to establish an accurate mathematical model, which is suitable for hysteresis and non-linear systems, but there are problems such as static difference and low control accuracy. Therefore, there are certain defects in using any one of the above control methods to control the environmental temperature alone. In view of the above, exemplary embodiments use a variable universe fuzzy control method combined with a PID control method to control the temperature of a target environment (such as the interior space of an automobile), in order to overcome the disadvantages when using any one of the conventional fuzzy control method and PID control method alone, thereby improving the accuracy of temperature control in the target environment and enhancing the user experience. Specifically, the variable universe fuzzy PID control according to exemplary embodiments is a hybrid control method that combines fuzzy control and PID control to complement each other's advantages, which can not only be applicable to the control of nonlinear systems but also reduce the static difference. The variable universe is equivalent to increasing the density of control rules without changing the fuzzy control rules, which further improves the control accuracy.

FIG. 1 schematically illustrates a flowchart of a temperature control method according to some exemplary embodiments. As shown in FIG. 1, the temperature control method includes the following steps S110-S140. Each step is explained in detail below.

S110, a data acquisition step: acquiring temperature data of a plurality of temperature detection points in a target environment.

Herein, the target environment can be any environment or space, such as the interior environment or space of an automobile or a room. Generally, the temperature in a target environment can be sensed by a temperature sensor. In step S110, a plurality of temperature detection points may be evenly distributed in the target environment, so as to obtain the overall temperature data in the entire target environment more comprehensively and accurately. Of course, the temperature detection points can be set according to the importance of different locations in the target environment or the subjective needs of the user. In addition, the temperature data may include the temperature values sensed by the temperature sensor, and may also include other temperature-related data, such as the humidity value and so on, in the target environment.

S120, a data processing step: calculating an average temperature value of the plurality of temperature detection points according to the collected temperature data and calculating a difference between the average temperature value and a target temperature value, which is taken as a first temperature difference.

After the temperature data acquisition and before the temperature control, the temperature data needs to be processed to determine a control object. In the step S120, the average temperature in the target environment is set as a control object. Therefore, when the average temperature deviates from the target temperature, control of the average temperature or a temperature difference between the average temperature and the target temperature may be initiated so that the average temperature approaches the target temperature or an absolute value of the temperature difference between the two, i.e., the first temperature difference, is small enough or close to zero. The reason why the average temperature is selected as the control object is that the average temperature can reflect the temperature situation in the target environment as a whole, so it can more comprehensively represent the temperature levels in various different locations to avoid the error of overgeneralization. Of course, the control object is not limited to the average temperature. For example, the temperature at the most important position for the user or the temperature at the geometric center point in the target environment may be also selected as the control object. The target temperature value may be preset. For example, it may be set by the user subjectively or be automatically set according to objective factors. The objective factors may include, for example, geographical location, season, and climatic conditions, etc. of the target environment.

S130, a determination step: determining whether an absolute value of the first temperature difference exceeds a first temperature difference threshold, if yes, going to a step S140; otherwise, returning to the step S110.

The first temperature difference threshold may be a preset positive number, which may be set according to specific conditions and requirements for temperature control. In the step S130, the absolute value of the first temperature difference is actually compared with the first temperature difference threshold, and then a temperature control can be performed according to the comparison result. That is, when the absolute value of the first temperature difference is greater than the first temperature difference threshold, the method proceeds to the step S140 to perform temperature control; when the absolute value of the first temperature difference is less than or equal to the first temperature difference threshold, the temperature control of the target environment is not initiated, because at this time the average temperature value is sufficiently close to the target temperature value (or, the temperature difference between the two values is small enough, and the average temperature value does not significantly deviate from the target temperature value), and thus it is not necessary to perform temperature control. In this case, the method can return to the step S110 to restart the acquisition of temperature data so as to enable cyclic control to achieve real-time temperature control.

Optionally, when the absolute value of the first temperature difference is less than or equal to the first temperature difference threshold, the temperature of the target environment may also be controlled uniformly. That is, the temperature of two adjacent temperature detection points with a large temperature difference is controlled to make the temperature distribution more uniform. For the temperature uniformity control, please refer to FIG. 6 and its corresponding description.

S140, a temperature control step: in response to the absolute value of the first temperature difference exceeding the first temperature difference threshold, controlling the temperature of the target environment by a variable universe fuzzy PID control algorithm.

When the absolute value of the first temperature difference is greater than the first temperature difference threshold, it indicates that the average temperature in the target environment deviates significantly from the target temperature value, and therefore temperature adjustment and control are required. Herein the variable universe fuzzy PID control algorithm refers to a hybrid control algorithm that combines variable universe fuzzy control and PID control. The expression "variable universe" means that the input fuzzy universe and/or the output fuzzy universe can be variable in fuzzy control. For example, the input and output fuzzy universes can be scaled by the input universe scaling factor and the output universe scaling factor, respectively. In the process of temperature control using the variable universe fuzzy PID algorithm, by means of the scaling of the universe, under the premise that the control rules are unchanged, the density of control rules can be increased indirectly, thereby improving the control accuracy. For the selection and determination of the universe scaling factor, please refer to FIG. 4 and its corresponding description.

The temperature control method according to some exemplary embodiments shown in FIG. 1 at least has the following beneficial effects:

Firstly, because a plurality of temperature detection points are provided in the target environment, the temperature conditions of different locations in the current environment can be more accurately reflected. Further, the average temperature value determined by taking the temperature data of a plurality of temperature detection points as data basis is selected as a controlled object, which can reflect the temperature situation in the target environment as a whole, and thus can more comprehensively represent the temperature levels in various different locations, thereby avoiding the error of overgeneralization, achieving accurate and uniform control of the environmental temperature, and enhancing the user experience.

Secondly, when using the variable universe fuzzy PID control algorithm to control the environmental temperature, due to combining the advantages of fuzzy control and PID control, it can not only improve the response speed and control accuracy, but also be suitable for a system having non-linearity, hysteresis, time-varying, and uncertainty and thus has a wider scope of application. Meanwhile, by the scaling of the universe, it can indirectly increase the density of control rules under the premise that the control rules are unchanged, thereby improving the control accuracy.

Figure 2:
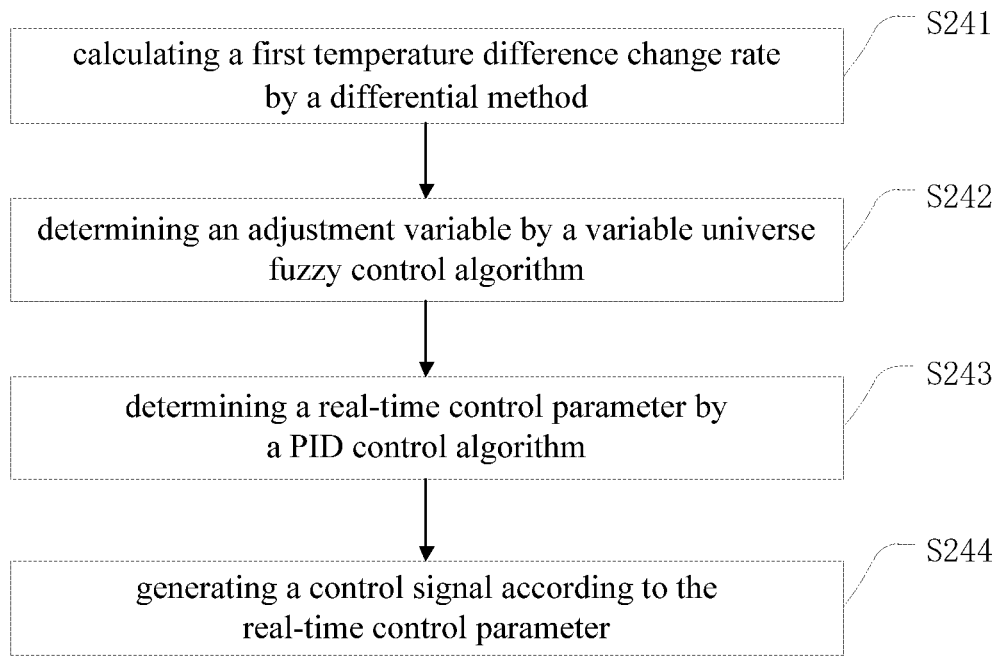
FIG. 2 schematically illustrates a flowchart of a temperature control method according to some exemplary embodiments.

FIG. 2 shows a flowchart of step S140—controlling the temperature of the target environment by a variable universe fuzzy PID control algorithm—in the temperature control method shown in FIG. 1 according to some exemplary embodiments. A specific implementation of performing environmental temperature control according to a variable universe fuzzy PID control according to some exemplary embodiments is described below with reference to FIG. 2. As shown in FIG. 2, the step of controlling the temperature of the target environment by the variable universe fuzzy PID control algorithm includes steps S241 to S244.

S241, calculating a first temperature difference change rate by a differential method.

In the variable universe fuzzy PID control process, there are mainly two control methods, namely variable universe fuzzy control and PID control. The input variables of these two control algorithms can be set as the first temperature difference and the first temperature difference change rate. Therefore, before realizing the control, it is necessary to calculate the first temperature difference change rate, which characterizes how fast the first temperature difference changes, by a differential method.

S242, determining an adjustment variable by means of a variable universe fuzzy control algorithm according to the first temperature difference and the first temperature difference change rate.

In the variable universe fuzzy control algorithm, the inputs are the first temperature difference and the first temperature difference change rate, and the output is an adjustment variable, which is used to adjust or correct the initial control parameter output by the PID control algorithm to obtain a real-time control parameter. The correction method can be performed by accumulation.

S243, determining a real-time control parameter by means of a PID control algorithm according to the first temperature difference and the adjustment variable.

In the PID control algorithm, the first temperature difference and the adjustment variable are used as inputs, and the real-time control parameter is used as an output. The specific process is: firstly, determining the initial control parameter by parameter tuning in the PID control algorithm, and then correcting the initial control parameter by using the adjustment variables to obtain the real-time control parameter.

In some exemplary embodiments, the step S243 may include: performing parameter tuning according to the first temperature difference by using the PID control algorithm to obtain an initial control parameter; and determining the real-time control parameter by accumulating the initial control parameter and the adjustment variable. Specifically, for the determination of the real-time control parameter, reference may be made to formula (1) below.

As the variable universe fuzzy PID controller itself has a parameter self-tuning function and good self-adaptation ability, it can continuously detect the first temperature difference and the first temperature difference change rate during operation, and modify the amount of parameter adjustment online according to the fuzzy control rules, to meet the different requirements of the different first temperature differences and the first temperature difference change rates on the control parameters, so that the controlled object has good dynamic and static performance, which makes the system have strong self-adaptation ability and recover in time when external disturbances occur without causing excessive oscillation.

S244, generating a control signal according to the real-time control parameter to control the temperature of the target environment.

After obtaining the real-time control parameter, a control signal can be generated according to the real-time control parameter to adjust the controlled object, such as the average temperature of the target environment. The specific adjustment mode of the average temperature can be to control a temperature adjustment device to adjust the average temperature in real-time according to the control parameter.

Optionally, the control signal may be a voltage signal or a current signal for controlling the temperature adjustment device.

Optionally, the temperature adjustment device may include: a hot air heating system and an air conditioning refrigeration system. For example, an action of controlling the temperature adjustment device to adjust the temperature of the current environment according to the control signal may include: controlling the hot air heating system to heat according to the control signal to increase the temperature of the current environment, or controlling the air conditioning refrigeration system to perform cooling according to the control signal to reduce the temperature of the current environment. Therefore, the difference between the average temperature value of a plurality of temperature detection points in the current environment and the target temperature value can be continuously reduced until the difference is within the first temperature difference threshold range.

Figure 3:
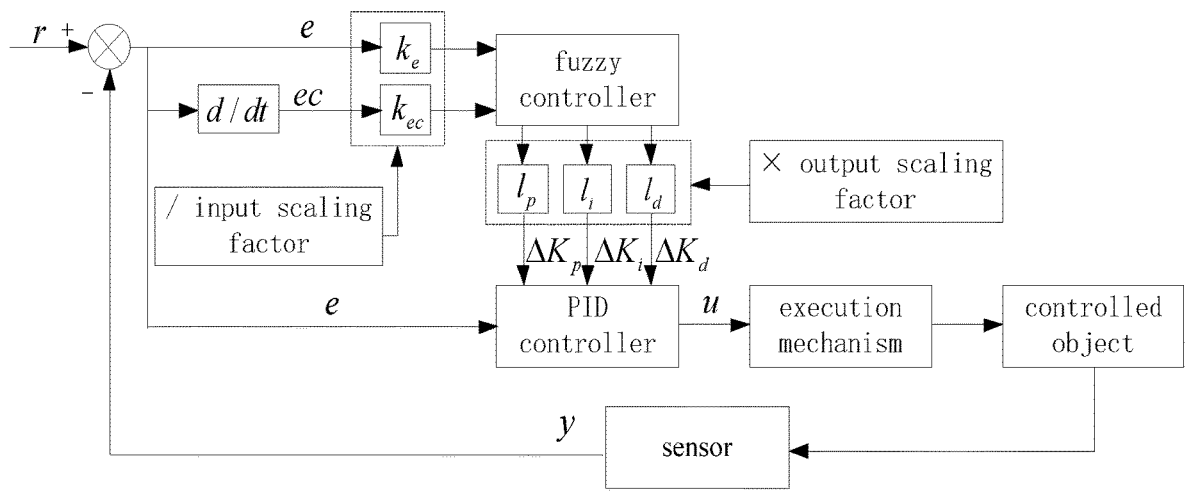
FIG. 3 schematically illustrates a principle of variable universe fuzzy PID control in a temperature control method according to some exemplary embodiments.

FIG. 3 illustrates a principle diagram of a temperature control method according to some exemplary embodiments. As shown in FIG. 3, the variable universe fuzzy PID controller (or algorithm) consists of a fuzzy controller (or algorithm) and a PID controller (or algorithm). In FIG. 3, r is the target temperature value, and y is the average temperature value of the respective temperature detection points in the target environment; e and ec are the first temperature difference (that is, the difference y-r or r-y between the average temperature value and the target temperature value) and the first temperature difference change rate respectively; $k_e$ and $k_{ec}$ are respectively the quantization factors of the first temperature difference e and the first temperature difference change rate ec, which are used to match the input basic universe and input fuzzy universe; and $l_p$, $l_i$, and $l_d$ are respectively proportional factors of $\Delta K_p$, $\Delta K_i$, and $\Delta K_d$, which are used to match the output basic universe and output fuzzy universe. The input scaling factor and output scaling factor can be used to equivalently achieve the scaling of the input and output fuzzy universes by changing the quantization factor and the proportional factor, respectively.

As shown in FIG. 3, the variable universe fuzzy PID controller or module includes a fuzzy controller and a PID controller. The input variables of the fuzzy controller are the first temperature difference e and the first temperature difference change rate ec, and the output variables are the adjustment variables $\Delta K_p$, $\Delta K_i$, and $\Delta K_d$ for adjusting the three control parameters $K_p$, and $K_d$ in the PID controller. The input variables of the PID controller is the first temperature difference e and the adjustment variables $\Delta K_p$, $\Delta K_i$, and $\Delta K_d$, and the output variable is a control signal u that is used to control the execution mechanism (that is, the temperature adjustment device, such as the heating system and the cooling system) to adjust the controlled object (the temperature or average temperature of the current environment). The control parameters $K_p$, $K_i$, and $K_d$ represent proportional, integral, and differential coefficients, respectively.

In the process of the PID controller generating the control signal u, the PID controller firstly generates an initial control signal according to the first temperature difference e, and then adjusts the control signal u in real-time according to the three control parameters $K_m$ and $K_d$, so as to obtain a more accurate control signal u. The adjustment of three real-time control parameters $K_p$, $K_i$, and $K_d$ can be performed by the following formula:

$$\begin{cases} K_p = K_{p0} + \Delta K_p \\ K_i = K_{i0} + \Delta K_i \\ K_d = K_{d0} + \Delta K_d \end{cases} \quad (1)$$

where $K_{p0}$, $K_{i0}$, and $K_{do}$ are preset PID initial control parameters.

Figure 4:
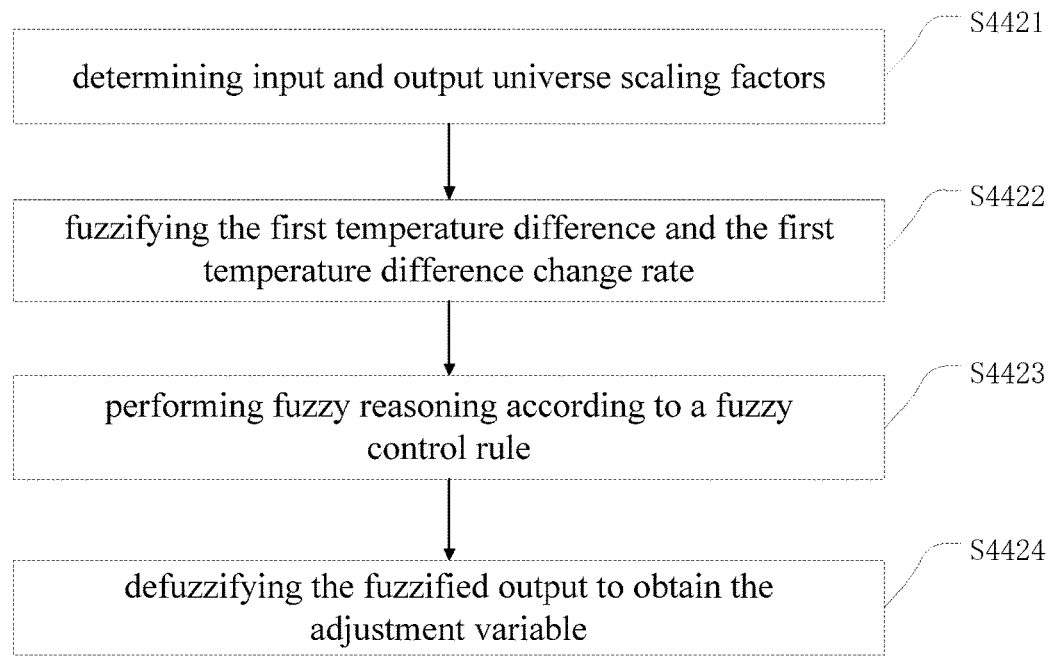
FIG. 4 schematically illustrates a flowchart of a temperature control method according to some exemplary embodiments.

FIG. 4 shows a flowchart of the step S242 of variable universe fuzzy control in the temperature control method shown in FIG. 2 according to some exemplary embodiments. As shown in FIG. 4, the step S242 shown in FIG. 2 of determining an adjustment variable by means of a variable universe fuzzy control algorithm according to the first temperature difference and the first temperature difference change rate includes S4421-S4424. S4421, determining an input universe scaling factor and an output universe scaling factor according to the first temperature difference and the first temperature difference change rate.

When the input variables (including the first temperature difference and the first temperature difference change rate) approach zero point, the input scaling factor increases the input variables by increasing the quantization factors, which is equivalent to compressing the input fuzzy universe. And, the closer the input variables approach zero point, the greater the degree of increasing the quantization factor by the input scaling factor. The quantization factor is divided by the input scaling factor.

The input universe scaling factor may be a function-based scaling factor or a fuzzy reasoning-based scaling factor. When the function-based scaling factor is adopted, the input scaling factor may be a piecewise proportional function, of which the piecewise threshold includes a temperature difference threshold and a temperature difference change rate threshold. By adopting the piecewise proportional function as the scaling factor, the input fuzzy universe can be conditionally scaled, which can reduce the amount of calculation while ensuring that the control accuracy is not affected, thereby improving the response speed and the real-time capability of the control.

Optionally, the output universe scaling factor can correspondingly reduce the proportional factor according to the degree of increase of the quantization factor, which is equivalent to compressing the output fuzzy universe. The proportional factor is multiplied by the output scaling factor. Optionally, the output scaling factor may be a function-based scaling factor or a fuzzy reasoning-based scaling factor.

S4422, fuzzifying the first temperature difference and the first temperature difference change rate to obtain a fuzzified input, where the input universe scaling factor is used to achieve the scaling of the input fuzzy universe.

With regard to the fuzzification process of the input value, a fuzzy membership function can be designed, which can convert the precise input values e and ec into fuzzified inputvalue to obtain the fuzzified input E and EC. The shape of the fuzzy membership function can be a triangular type membership function and a Gaussian type membership function, etc. For example, assuming that the basic universes of the first temperature difference e and the first temperature difference change rate ec can be selected as [−10, 10], [−1, 1] respectively, the basic universes of output variables $\Delta K_p$, $\Delta K_i$, and $\Delta K_d$ can be selected as [−1.5, 1.5], [−0.015, 0.015], and [−3, 3] respectively, the fuzzy universes of the respective inputs and outputs are all selected as [−3, 3]. The fuzzy universes of inputs and outputs are divided by using 7 fuzzy subsets. The membership function uses a combination of the triangular type and the Gaussian type. The fuzzy language values corresponding to the fuzzy subsets are {NB (negative big), NM (negative medium), NS (negative small), ZE (zero), PS (positive small), PM (positive medium), and PB (positive big)}, respectively. Through the fuzzification process, the basic universes of first temperature difference e and first temperature difference change rate ec as the input variables are converted into fuzzy universes, and their clear values are converted into fuzzy language values, so that fuzzy reasoning can be performed in subsequent steps to realize the transition from fuzzified inputs to fuzzified outputs.

S4423, performing fuzzy reasoning according to a fuzzy control rule to convert the fuzzified input into a fuzzified output, where the output universe scaling factor is used to achieve the scaling of the output fuzzy universe.

Generally, fuzzy reasoning can be performed on the parameter adjustment variable according to the fuzzy control rules corresponding to the input fuzzy universe and the output fuzzy universe. The fuzzy control rules can be set according to actual application scenarios. For example, preliminary fuzzy control rules can be obtained based on existing empirical models or empirical data in the actual application scenarios, and the preliminary fuzzy control rules can be adaptively adjusted according to actual needs, to obtain the fuzzy control rules. The general principle of fuzzy reasoning is as follows. The input fuzzy universe includes multiple input fuzzy subsets with numerical magnitude order, and the output fuzzy universe includes multiple output fuzzy subsets with numerical magnitude order. Each input fuzzy subset corresponds to a fuzzy language value of a first temperature difference and a fuzzy language value of a first temperature difference change rate. Each output fuzzy universe includes a fuzzy language value of a parameter adjustment variable. The fuzzy language value of each first temperature difference and the fuzzy language value of each first temperature difference change rate have a certain fuzzy relationship with a fuzzy language value of a parameter adjustment variable. According to the fuzzy language value of the first temperature difference and the fuzzy language value of the first temperature difference change rate and the fuzzy relationship, the fuzzy language value of the parameter adjustment variable can be determined. More specific setting ways and fuzzy control rules will be detailed in subsequent examples.

Optionally, the action of performing fuzzy reasoning on the parameter adjustment variable according to the fuzzy control rules corresponding to the input fuzzy universe and the output fuzzy universe may include: firstly determining the input fuzzy subset corresponding to the first temperature difference and the first temperature difference change rate, for example, the fuzzy language value corresponding to the first temperature difference and the fuzzy language value corresponding to the first temperature difference change rate being determined according to the corresponding input fuzzy subset; secondly, determining the fuzzy language value corresponding to the parameter adjustment variable according to the determined fuzzy language value corresponding to the first temperature difference and the determined fuzzy language value corresponding to the first temperature difference change rate.

S4424, defuzzifying the fuzzified output to obtain the adjustment variable.

Referring to FIG. 3, the variable universe fuzzy PID control algorithm according to the present disclosure includes two parts: variable universe fuzzy control and PID control. FIG. 4 actually shows a flowchart of the part of the variable universe fuzzy control.

In some exemplary embodiments, the input universe scaling factor and output universe scaling factor in the step S4421 may be designed or determined by the following formulas (2)-(4).

Firstly, regarding the input universe scaling factor, a piecewise function-based scaling factor can be designed based on the traditional proportion-based scaling factor. By adopting the piecewise proportional function as the scaling factor, the input fuzzy universe can be conditionally scaled, which can reduce the amount of calculation while ensuring that the control accuracy is not affected, thereby improving the response speed and the real-time capability of the control. Specifically, assuming that the basic universes of the first temperature difference e and the first temperature difference change rate ec are $X_e=[-x_{emax}, x_{emax}]$ and $X_{ec}=[-x_{ecmax}, x_{ecmax}]$, respectively, the input universe scaling factor can be expressed as:

$$\alpha(e) = \begin{cases} \left(\frac{|e|}{x_{e\,max}}\right)^{\lambda_i} + \varepsilon_i & |e| < \theta_i \\ 1 & |e| \geq \theta_i \end{cases} \quad (2)$$

$$(ec) = \begin{cases} \left(\frac{|ec|}{x_{ec\,max}}\right)^{\lambda_i} + \varepsilon_i & |ec| < \theta_i \\ 1 & |ec| \geq \theta_i \end{cases} \quad (3)$$

where $\alpha(e)$ represents the input universe scaling factor of the first temperature difference e, $\alpha(ec)$ represents the input universe scaling factor of the first temperature difference change rate ec, and $\theta_1$ represents a piecewise threshold, i.e. the temperature difference threshold (that is, the threshold of the absolute value of the first temperature difference e) or the temperature difference change rate threshold (that is, the threshold of the absolute value of the first temperature difference change rate ec). Specifically, if i=1 in the expression (2), the $\theta_1$ represents the temperature difference threshold at this time, and if i=2 in the expression (3), $\theta_2$ represents the temperature difference change rate threshold at this time. Both $\theta_1$ and $\theta_2$ are positive values, and $\theta_1$ may be an absolute value of a boundary of the first temperature difference threshold range. $\lambda_1$ and $\varepsilon_1$ represent input sensitivity adjustment parameters, wherein the larger the value of the former, the smaller the value of the latter, the more sensitive the controller is to changes in the input, and the more conducive to reduce the impact of the dead zone and to improve the control accuracy.

It can be known from the expressions (2) and (3) that only when the absolute value of the input first temperature difference e is less than the temperature difference threshold $\theta_1$ and the first temperature difference change rate ec is less than the temperature difference change rate threshold $\theta_2$, the scaling factor changes the quantization factor to equivalently achieve the scaling of the input fuzzy universe, which avoids unnecessary calculations caused by universe scaling across the entire universe, thereby reducing the computational burden of the microcontroller in the vehicle.

The sizes of $\theta_1$ and $\theta_2$ determine the control precision and the amount of calculation, and the specific values of $\theta_1$ and $\theta_2$ can be set according to actual needs. When i=1 in the expression (2) and i=2 in the expression (3), for parameters $\lambda_i$, $\lambda_2$, $\varepsilon_1$ and $\varepsilon_2$, the larger the values of the first two parameters, the smaller the values of the last two parameters, the more sensitive the fuzzy controller is to changes in the input, and the more conducive to reduce the impact of the dead zone and to improve the control accuracy. For example, the following settings can be used: $\lambda_1=\lambda_2=0.7$, $\varepsilon_1=10^{-5}$, and $\varepsilon_2=10^{-6}$.

In the process of variable universe fuzzy PID control, the piecewise proportional function is used as the input scaling factor, so that only when the input variable is in a numerical range, the fuzzy universe of the input variable is scaled by the input scaling factor, which avoids the unnecessary calculations caused by universe scaling across the entire universe while ensuring the control accuracy, thereby reducing the computational burden of microcontrollers in the current environment. As the amount of calculation is greatly reduced, the response speed is greatly improved, which increases the real-time capability of the temperature control.

If the basic universes of the first temperature difference e and the first temperature difference change rate ec are $X_e=[-x_{emax},x_{emax}]$ and $X_{ec}=[-x_{ecmax},x_{ecmax}]$, respectively, the output universe scaling factor can be expressed as:

$$\beta(e, ec) = \frac{1}{2}\left[\left(\frac{|e|}{x_{e\ max}}\right)^{0.7} + \left(\frac{|ec|}{x_{ec\ max}}\right)^{0.7}\right] \quad (4)$$

Because the output universe scaling factor directly affects the self-tuning of the PID controller parameters, in order to ensure the control accuracy, no threshold is set. The proportional factor can be changed by the output scaling factor β (e,ec) within a large range, so as to achieve the scaling of the output fuzzy universe.

In some exemplary embodiments, regarding the specific implementation of the step S4423 of performing fuzzy reasoning according to a fuzzy control rule to convert the fuzzified inputs into fuzzified outputs, the adjustment variables $\Delta K_p$, $\Delta K_i$, $\Delta K_d$, for example the Mamdani algorithm may be adopted to perform fuzzy reasoning. The Mamdani algorithm used for fuzzy reasoning is simple in calculation and feasible.

The principle of the Mamdani algorithm is described below.

7 fuzzy subsets are used to perform the fuzzy division for the scaled input fuzzy universe and output fuzzy universe, and fuzzy language values are set for 7 fuzzy subsets. Each fuzzy language value corresponds to values of a set of output variables $\Delta K_p$, $\Delta K$ and $\Delta K_d$. The membership function on which the division is based can be a triangular-type function or a Gaussian function. The fuzzy language values corresponding to the 7 fuzzy subsets are NB (negative big), NM (negative medium), NS (negative small), ZE (zero), PS (positive small), PM (positive medium), and PB (positive big), respectively.

Figure 5:
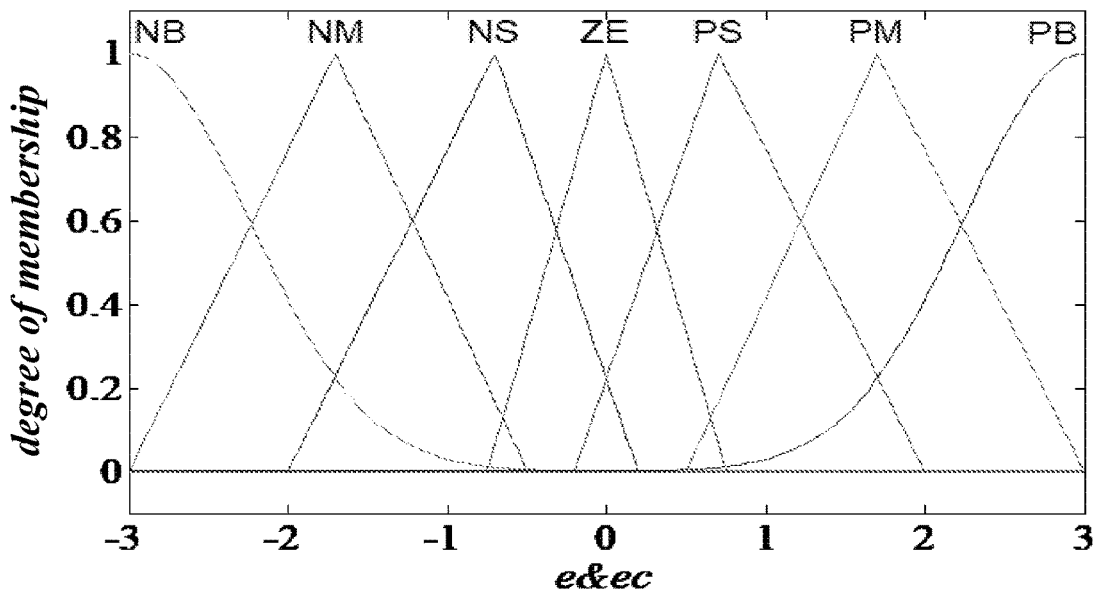
FIG. 5 illustrates a graph of a membership function of an input fuzzy universe vs. an output fuzzy universe in a variable universe fuzzy PID control process in a temperature control method according to some exemplary embodiments.

FIG. 5 illustrates a graph of a membership function of an input and output fuzzy universe in a temperature control method according to some exemplary embodiments. Taking the input fuzzy universe and output fuzzy universe each being [−3, 3] as an example, the membership function graph shown in FIG. 5 shows a fuzzy division of the input fuzzy universe and the output fuzzy universe, wherein the horizontal axis represents the values of e and ec, and the vertical axis represents the degree of membership of e and ec to each fuzzy language value. The closer the degree of membership of a certain group of e and ec approaches 1, the closer the group of e and ec approaches the corresponding fuzzy language value, that is the greater the degree that the group of e and ec belongs to the fuzzy subset corresponding to the fuzzy language value.

Based on the above-mentioned fuzzy division of the input fuzzy universe and the output fuzzy universe and the preset fuzzy control rules, the output variables $\Delta K_p$, $\Delta K_i$, $\Delta K_d$ of the fuzzy controller can be controlled.

Specifically, the above fuzzy control rules are as follow: when the first temperature difference e is a large value, the real-time control parameter $K_p$ of the PID controller is increased in order to speed up the response speed, the real-time control parameter $K_d$ is appropriately increased in order to avoid overshoot, and the real-time control parameter $K_i$ is reduced in order to decrease integral saturation; when the first temperature difference e is a medium value, $K_p$ is reduced in order to reduce the overshoot, $K_i$ is increased in order to increase the stability of the system, and $K_d$ is taken a moderate value in order to ensure the response speed; when the first temperature difference e is a small value, $K_p$ is reduced in order to ensure the stability of the system, $K_i$ is appropriately increased in order to improve the steady-state accuracy of the system, and $K_d$ is reduced when the first temperature difference change rate ec is large and $K_d$ is increased when ec is small in order to avoid oscillation.

Optionally, by combining the above-mentioned fuzzy control rules with the fuzzy division, a fuzzy control rule table from fuzzified inputs to fuzzified outputs as shown in Table 1 can be obtained. In Table 1, E and EC represent fuzzy language variables corresponding to the first temperature difference e and the first temperature difference change rate ec, respectively.

TABLE 1

Fuzzy control rule table

| E | EC | | | | | | |
|---|---|---|---|---|---|---|---|
|   | NB | NM | NS | ZE | PS | PM | PB |
| NB | PB/NB/PS | PB/NB/NS | PM/NM/NB | PM/NM/NB | PS/NS/NB | ZE/ZE/NM | ZE/ZE/PS |
| NM | PB/NB/PS | PB/NB/NS | PM/NM/NB | PS/NS/NM | PS/NS/NM | ZE/ZE/NS | NS/ZE/ZE |
| NS | PM/NB/ZE | PM/NM/NS | PM/NS/NM | PS/NS/NM | ZE/ZE/NS | NS/PS/NS | NS/PS/ZE |
| ZE | PM/NM/ZE | PM/NM/NS | PS/NS/NS | ZE/ZE/NS | NS/PS/NS | NM/PM/NS | NM/PM/ZE |
| PS | PS/NM/ZE | PS/NS/ZE | ZE/ZE/ZE | NS/PS/ZE | NS/PS/ZE | NM/PM/ZE | NM/PB/ZE |
| PM | PS/ZE/PB | ZE/ZE/PS | NS/PS/PS | NM/PS/PS | NM/PM/PS | NM/PB/PS | NB/PB/PS |
| PB | ZE/ZE/PB | ZE/ZE/PM | NM/PS/PM | NM/PM/PM | NM/PM/PS | NB/PB/PS | NB/PB/PB |

Referring to the fuzzy rule control table, the fuzzy language values of the corresponding output variables $\Delta K_p$, $\Delta K_i$, and $\Delta K_d$ may be determined according to changes in the first temperature difference e and the first temperature difference change rate ec as the inputs. For example, as shown in Table 1, when the fuzzy language values of the fuzzy language variables E and EC are both NB, the values of the output variables $\Delta K_p$, $\Delta K_i$, and $\Delta K_d$ are the fuzzy language values PB, NB, and PS, respectively.

In some exemplary embodiments, regarding the step S4424 of defuzzifying, after determining the fuzzy language values of the parameter adjustment variables $\Delta K_p$, $\Delta K_i$, and $\Delta K_d$, the fuzzy language values (i.e., the fuzzified output variables) can be defuzzified by the centroid method. The defuzzified adjustment variables $\Delta K_p$, $\Delta K_i$, and $\Delta K_d$ are used to adjust the real-time control parameters $K_p$, and $K_d$ by means of the aforementioned expression (1) to obtain the real-time control parameters $K_p$, and $K_d$ of the PID controller. Based on the real-time control parameters $K_p$, and $K_d$, a control signal u can be output to achieve control of the execution mechanism so as to enable the execution mechanism to adjust the controlled object. The centroid method is reasonable and intuitive, and can better reflect the information contained in the fuzzy set.

Figure 6:
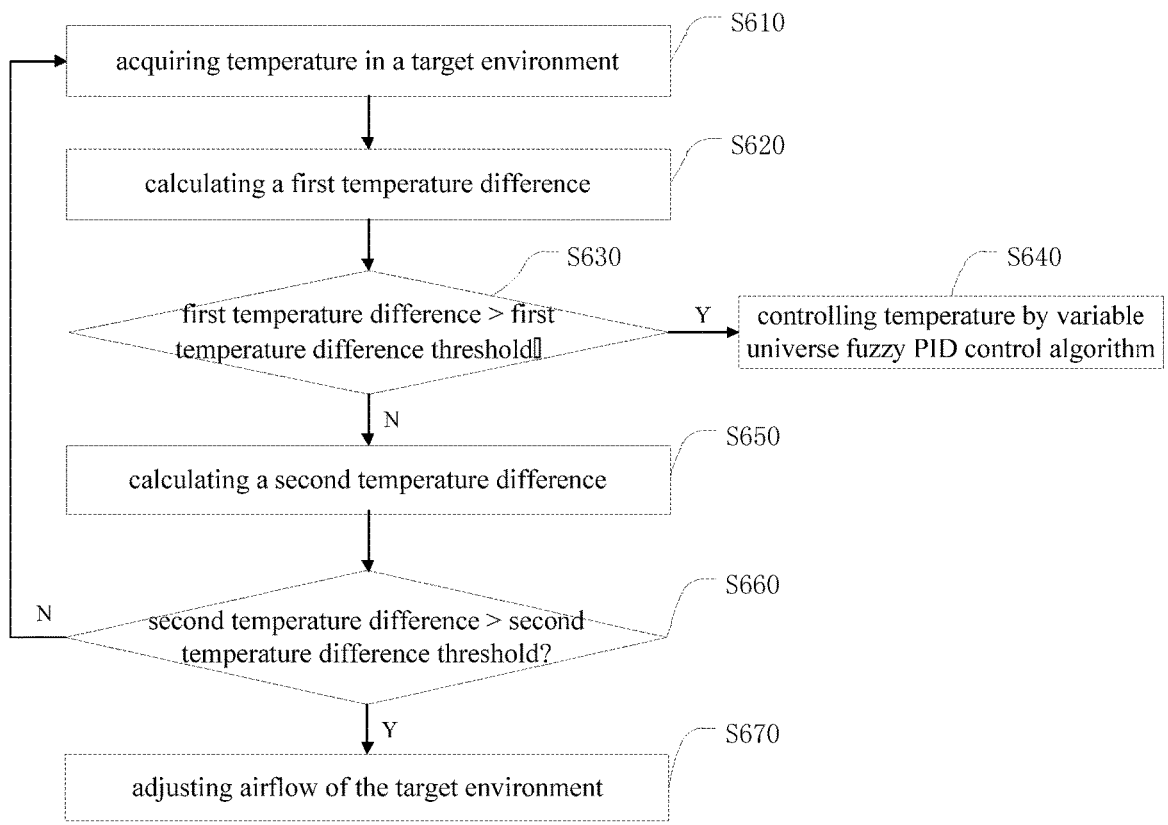
FIG. 6 schematically illustrates a flowchart of a temperature control method according to some exemplary embodiments.

FIG. 6 illustrates a flowchart of a temperature control method according to some exemplary embodiments.

As shown in FIG. 6, the temperature control method is similar to the temperature control method shown in FIG. 1, wherein the steps S610-S640 are basically the same as the steps S110-S140 in FIG. 1 and will not be repeated here. In addition, the temperature control method shown in FIG. 6 further includes the following steps:

S650, in response to that the absolute value of the first temperature difference does not exceed the first temperature difference threshold, calculating, according to the temperature data, a temperature difference between any two adjacent temperature detection points in the plurality of temperature detection points, which is taken as a second temperature difference;

S660, determining whether an absolute value of the second temperature difference exceeds a second temperature difference threshold; If exceeds, going to S670, otherwise going to S610; and S670, in response to the absolute value of the second temperature difference exceeding the second temperature difference threshold, adjusting airflow of the target environment.

Compared with FIG. 1, the temperature control method shown in FIG. 6 actually increases the function of controlling the uniformity of the temperature distribution of various locations in the target environment or suppressing excessive temperature differences between adjacent detection points, so that the temperature difference between different locations in the target environment is reduced and the different locations have a uniform temperature, in order to prevent the adverse impact on the user's physical and mental health caused by the unbalanced temperature distribution, thereby enhancing the user experience The temperature uniformity control in FIG. 6 is described below with a specific example. If there are three temperature detection points A, B, and C adjacent to each other in the target environment, $T_AM$, $T_B(t)$, $T_C(t)$ are used to respectively represent the temperature data of the three temperature detection points at time t, and the second temperature differences between A and B, $[T_A(t)-T_B(t)]$, between A and C, $[T_C(t)-T_A(t)]$, and between B and C, $[T_B(t)-T_C(t)]$ at time t are respectively determined.

If the second temperature difference threshold is set to 1, that is, the second temperature difference range is [−1,1] (unit: ° C.), when any of the above second temperature differences is greater than 1° C. or less than −1° C., that is, $|T_A(t)-T_B(t)|>1°$ C., $|T_B(t)-T_C(t)|>1°$ C., or $|T_C(t)-T_A(t)|>1°$ C. the ventilation system is controlled to ventilate in order to adjust the airflow in the current environment, until each of the second temperature differences at current time t+d belongs to [−1,1], that is, $|T_A(t+d)-T_B(t+d)|\leq 1°$ C., $|T_B(t+d)-T_C(t+d)|\leq 1°$ C., and $|T_C(t+d)-T_A(t+d)|\leq 1°$ C. are met simultaneously.

The temperature control method shown in FIG. 6 has the following beneficial effects: when the first temperature difference between the average temperature value and the target temperature value is within the first temperature difference threshold range, the embodiment of the present disclosure can determine the second temperature difference between any two adjacent temperature detection points and adjust the airflow of the current environment correspondingly according to the magnitude of second temperature difference, so that the temperatures near at least two temperature detection points become uniform through the airflow, thereby controlling the entire temperature field of the current environment, improving the uniformity of temperature distribution in the entire temperature field, and optionally improving the user experience.

Figure 7:
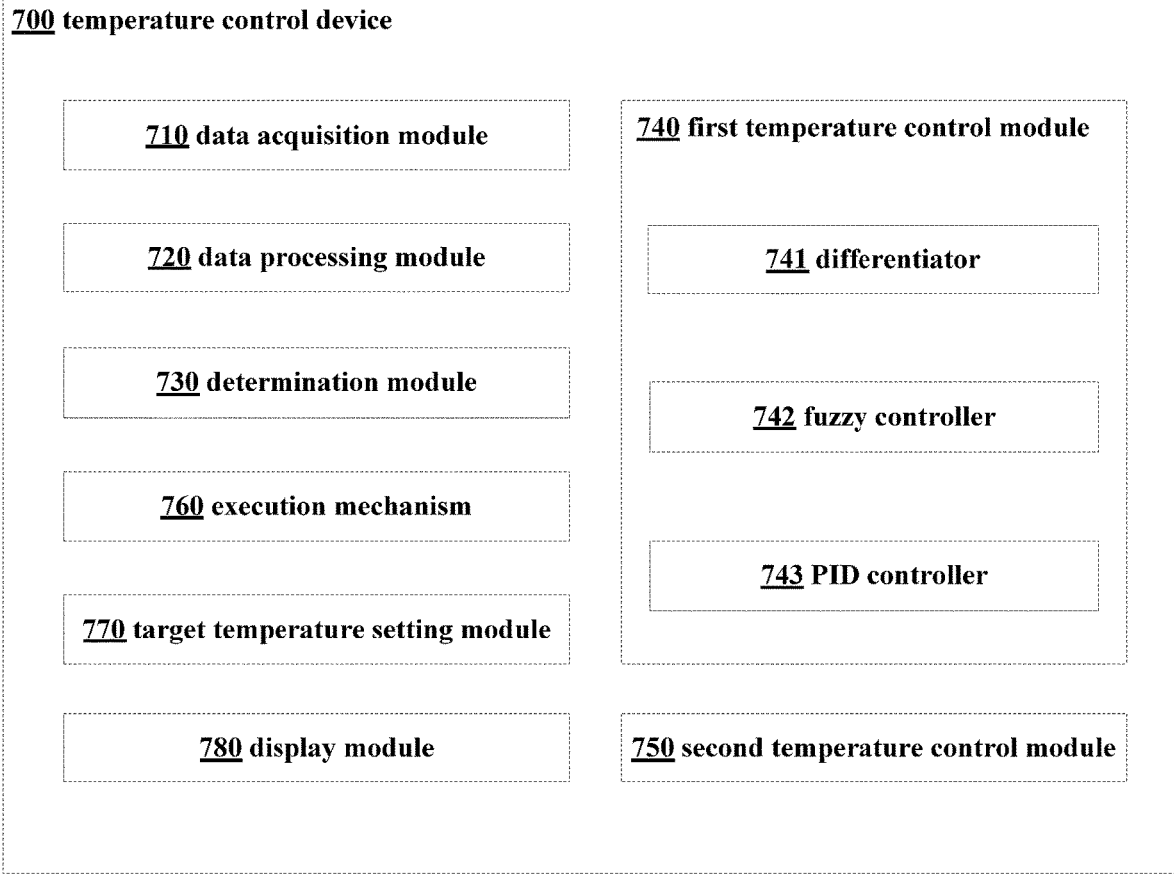
FIG. 7 schematically illustrates a structural block diagram of a temperature control device according to some exemplary embodiments.

FIG. 7 shows a structural block diagram of a temperature control device according to some exemplary embodiments. As shown in FIG. 7, the temperature control device 700 may include:

a data acquisition module 710 configured to acquire temperature data of a plurality of temperature detection points in a target environment;

a data processing module 720 configured to calculate an average temperature value of the plurality of temperature detection points according to the temperature data and calculate a difference between the average temperature value and a target temperature value, which is taken as a first temperature difference;

a determination module 730 configured to determine whether an absolute value of the first temperature difference exceeds a first temperature difference threshold; and a first temperature control module 740 configured to, in response to the absolute value of the first temperature difference exceeding the first temperature difference threshold, control the temperature of the target environment by a variable universe fuzzy PID control algorithm.

In some exemplary embodiments, as shown in FIG. 7, the temperature control device 700 further includes:

a second temperature control module 750 configured to:

in response to that the absolute value of the first temperature difference does not exceed the first temperature difference threshold, calculate, according to the temperature data, a temperature difference between any two adjacent temperature detection points in the plurality of temperature detection points, which is taken as a second temperature difference;

determine whether an absolute value of the second temperature difference exceeds a second temperature difference threshold, and in response to the absolute value of the second temperature difference exceeding the second temperature difference threshold, adjust airflow of the target environment.

In some exemplary embodiments, as shown in FIG. 7, the temperature control device 700 may further include an execution mechanism 760 configured to adjust the temperature of the target environment, and the first temperature control module 740 is further configured to: use the execution mechanism to control the temperature of the target environment by a variable universe fuzzy PID control algorithm. Optionally, the execution mechanism may include a heating system and a refrigeration system.

In some exemplary embodiments, as shown in FIG. 7, the temperature control device 700 may further include: a target temperature setting module 770 configured to receive setting of the target temperature value, and a display module 780 configured to display at least one of the temperature data and the average temperature value. Optionally, the target temperature setting module 770 may be an input device for receiving a target temperature value input by a user; and the display module 780 may include a liquid crystal display or a touch display.

In some exemplary embodiments, as shown in FIG. 7, the first temperature control module 740 includes:

a differentiator 741 configured to calculate a first temperature difference change rate by a differential method according to the first temperature difference;

a fuzzy controller 742 configured to determine an adjustment variable by means of a variable universe fuzzy control algorithm according to the first temperature difference and the first temperature difference change rate; and a PID controller 743 configured to determine a real-time control parameter by means of a PID control algorithm according to the first temperature difference and the adjustment variable and thereby to generate a control signal for controlling the temperature of the target environment.

It should be noted that the temperature control device 700 according to some exemplary embodiments shown in FIG. 7 may be used to perform the temperature control method according to some exemplary embodiments described above. The implementation principles and corresponding beneficial effects of the temperature control device 700 are similar to the temperature control method according to some exemplary embodiments described above, and thus will not be described in detail here.

An exemplary embodiment further provides a computer-readable storage medium having stored thereon computer-readable instructions that, when executed, perform the temperature control method according to some exemplary embodiments.

The above description is only part of the embodiments of the present disclosure. It should be noted that for those of ordinary skill in the art, without departing from the principles of the present disclosure, several improvements and retouches can also be made. These improvements and retouches should also be regarded as the scope of protection of the present disclosure.

In the description of the present specification, the descriptions of the terms "one exemplary embodiment", "some exemplary embodiments", "example", "specific example(s)", or "some examples" and the like are intended to mean the specific features, structures, materials or characteristics described in connection with the exemplary embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined or integrated by those skilled in the art without conflicting.

In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include at least one of the features. In the description of the present disclosure, the meaning of "a plurality" is at least two, for example, two, three, etc., unless it is explicitly and specifically defined otherwise.

Any process or method description in the flowcharts or otherwise described herein can be understood to represent a module, segment or portion of code comprising one or more executable instructions for implementing the steps of a custom logic function or process. The scope of the optional embodiments of the present disclosure comprises additional implementations in which the functions may be performed in an order not shown or discussed, e.g., in a substantially simultaneous manner or in the reverse order, depending on the function involved, which will be understood by those skilled in the art to which the embodiments of the present disclosure belongs.

The logic and/or steps represented in the flowchart or otherwise described herein, for example, may be considered as an ordered list of executable instructions for implementing logical functions, and may be embodied in any computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "computer-readable medium" can be any apparatus that can contain, store, communicate, propagate, or transport a program for use in an instruction execution system, apparatus, or device, or in conjunction with such an instruction execution system, apparatus, or device. More specific examples of the computer readable medium may comprise, for example, the following: an electrical connection (electronic device) having one or more wires, a portable computer disk (magnetic device), a random access memory, read only memory, erasable programmable read only memory or flash memory, optical fiber devices, and compact disc read only memory. In addition, the computer readable medium may even be a paper or other suitable medium on which the program can be printed, as the paper or other medium may be optically scanned, followed by editing, interpretation or, if appropriate, other suitable manner to obtain the program electronically and then store it in computer memory.

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, ASIC with appropriate combinational logic gates, programmable gate array, field programmable gate array, and the like.

One of ordinary skill in the art will appreciate that all or part of the steps of the above-described embodiments may be performed by hardware associated with program instructions, which may be stored in a computer readable storage medium and may comprise, when executed, one or a combination of the steps of the execution method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

It should be noted that in the claims, use of the verb "comprise/include" and its variants does not exclude the presence of elements or steps not stated in the claims. The word "a" or "an" does not exclude a plurality.

The invention claimed is:

1. A temperature control method, comprising:
acquiring temperature data of a plurality of temperature detection points in a target environment;
calculating, according to the temperature data, an average temperature value of the plurality of temperature detection points and a first temperature difference between the average temperature value and a target temperature value;
determining whether an absolute value of the first temperature difference exceeds a first temperature difference threshold;
in response to the absolute value of the first temperature difference exceeding the first temperature difference threshold, controlling the temperature of the target environment by a variable universe fuzzy PID control algorithm;
calculating a second temperature difference between any two adjacent temperature detection points in the plurality of temperature detection points according to the temperature data;
determining whether an absolute value of the second temperature difference exceeds a second temperature difference threshold; and
in response to the absolute value of the second temperature difference exceeding the second temperature difference threshold, adjusting airflow of the target environment,
wherein the controlling the temperature of the target environment by a variable universe fuzzy PID control algorithm comprises:
calculating a first temperature difference change rate by a differential method;
determining an adjustment variable by means of a variable universe fuzzy control algorithm according to the first temperature difference and the first temperature difference change rate;
determining a real-time control parameter by means of a PID control algorithm according to the first temperature difference and the adjustment variable; and
generating a control signal according to the real-time control parameter to control the temperature of the target environment.

2. The temperature control method according to claim 1, wherein the determining an adjustment variable by means of a variable universe fuzzy control algorithm according to the first temperature difference and the first temperature difference change rate comprises:
determining an input universe scaling factor and an output universe scaling factor according to the first temperature difference and the first temperature difference change rate;
fuzzifying the first temperature difference and the first temperature difference change rate to obtain a fuzzified input;
performing fuzzy reasoning according to a fuzzy control rule to convert the fuzzified input into a fuzzified output; and
defuzzifying the fuzzified output to obtain the adjustment variable.

3. The temperature control method according to claim 2, wherein the input universe scaling factor is determined by the following piecewise proportional function:

$$\alpha(e) = \begin{cases} \left(\frac{|e|}{x_{e\ max}}\right)^{\lambda_i} + \varepsilon_i & |e| < \theta_i \\ 1 & |e| \geq \theta_i \end{cases}$$

$$\alpha(ec) = \begin{cases} \left(\frac{|ec|}{x_{ec\ max}}\right)^{\lambda_i} + \varepsilon_i & |ec| < \theta_i \\ 1 & |ec| \geq \theta_i \end{cases}$$

wherein e and ec represent the first temperature difference and the first temperature difference change rate respectively, which have basic universes of $X_e=[-x_{emax}, x_{emax}]$ and $X_{ec}=[-x_{ecmax}, x_{ecmax}]$, respectively, and
wherein $\theta_i$, is a piecewise threshold, parameters $\lambda_i$ and $\varepsilon_i$ are sensitivity adjustment parameters, wherein i=1,2.

4. The temperature control method according to claim 2, wherein the output universe scaling factor is determined by the following formula:

$$\beta(e, ec) = \frac{1}{2}\left[\left(\frac{|e|}{x_{e\ max}}\right)^{0.7} + \left(\frac{|ec|}{x_{ec\ max}}\right)^{0.7}\right]$$

wherein e and ec respectively represent the first temperature difference and the first temperature difference change rate, which have basic universes of $X_e=[-x_{emax}, x_{emax}]$ and $X_{ec}=[-x_{ecmax}, x_{ecmax}]$, respectively.

5. The temperature control method according to claim 2, wherein the performing fuzzy reasoning according to a fuzzy control rule to convert the fuzzified input into a fuzzified output comprises performing the fuzzy reasoning by means of Mamdani algorithm.

6. The temperature control method according to claim 2, wherein the defuzzifying the fuzzified output to obtain the adjustment variable comprises: defuzzifying the fuzzified output by means of a centroid method.

7. The temperature control method according to claim 1, wherein the determining a real-time control parameter by means of a PID control algorithm according to the first temperature difference and the adjustment variable comprises:
performing parameter tuning according to the first temperature difference by means of the PID control algorithm to obtain an initial control parameter; and
determining the real-time control parameter by accumulating the initial control parameter and the adjustment variable.

8. The temperature control method according to claim 1, further comprising:
before calculating, according to the temperature data, an average temperature value of the plurality of temperature detection points and a difference between the average temperature value and a target temperature value, receiving a setting of the target temperature value.

9. A temperature control device comprising:
a data acquisition module configured to acquire temperature data of a plurality of temperature detection points in a target environment;
a data processing module configured to calculate, according to the temperature data, an average temperature value of the plurality of temperature detection points and a first temperature difference between the average temperature value and a target temperature value;

a determination module configured to determine whether an absolute value of the first temperature difference exceeds a first temperature difference threshold; and a first temperature control module configured to, in response to the absolute value of the first temperature difference exceeding the first temperature difference threshold, control the temperature of the target environment by a variable universe fuzzy PID control algorithm;

a second temperature control module configured to: calculate, according to the temperature data, a second temperature difference between any two adjacent temperature detection points in the plurality of temperature detection points; determine whether an absolute value of the second temperature difference exceeds a second temperature difference threshold; and in response to the absolute value of the second temperature difference exceeding the second temperature difference threshold, adjust airflow of the target environmentcal, wherein the first temperature control module comprises:

a differentiator configured to calculate a first temperature difference change rate by a differential method according to the first temperature difference;

a fuzzy controller configured to determine an adjustment variable by means of a variable universe fuzzy control algorithm according to the first temperature difference and the first temperature difference change rate; and a PID controller configured to determine a real-time control parameter by means of a PID control algorithm according to the first temperature difference and the adjustment variable and thereby to generate a control signal for controlling the temperature of the target environment.

10. The temperature control device according to claim 9, further comprising an execution mechanism configured to adjust the temperature of the target environment, and the first temperature control module is further configured to control the temperature of the target environment by a variable universe fuzzy PID control algorithm by means of the execution mechanism.

11. The temperature control device according to claim 10, wherein the execution mechanism comprises a heating system and a refrigeration system.

12. The temperature control device according to claim 9, further comprising:

a target temperature setting module configured to receive a setting of the target temperature value; and a display module configured to display at least one of the temperature data and the average temperature value.

13. A computer-readable storage medium having stored thereon computer-readable instructions that, when executed, perform the method according to claim 1.

* * * * *